United States Patent [19]

Natsume et al.

[11] Patent Number: 5,430,269
[45] Date of Patent: Jul. 4, 1995

[54] SUBMERGED ARC WELDING METHOD FOR HIGH STRENGTH CR-MO STEEL

[75] Inventors: Syogo Natsume; Akinobu Gotoh; Takeshi Nakagawa, all of Fujisawa, Japan

[73] Assignee: Kabushiki Kaisha Kobe Seiko Sho, Kobe, Japan

[21] Appl. No.: 248,208

[22] Filed: May 24, 1994

[30] Foreign Application Priority Data

May 24, 1993 [JP] Japan .................. 5-144271

[51] Int. Cl.$^6$ ............................... B23K 9/18
[52] U.S. Cl. ...................... 219/73; 219/137 WM
[58] Field of Search ............... 219/73, 73.2, 137 WM

[56] References Cited

U.S. PATENT DOCUMENTS 4,273,838 6/1981 Biemiller.

OTHER PUBLICATIONS

Chemical Abstracts, vol. 117, No. 2, Jul. 13, 1992, AN 12169j, A. Sueda, et al., "Submerged-Arc Welding of Chromium-Molybdenum Steels", p. 263 & JP 3-258490, Nov. 18, 1991.
Chemical Abstracts, vol. 114, No. 26, Jul. 1, 1991, AN 251554a, A. Yamamura, et al., "Submerged-Arc Welding of High Tensile-Strength Chromium-Molybdenum Steel", p. 269 & JP 2-182378, Jul. 17, 1990.
Database WPI, Derwent Publications Ltd., AN 92-352627, JP-A-04 253 595, Sep. 9, 1992.
Patent Abstracts of Japan, vol. 9, No. 135 (M-386)(1858), Jun. 11, 1985, JP-A-60 18280, Jan. 30, 1985.

Primary Examiner—Clifford C. Shaw
Attorney, Agent, or Firm—Oblon, Spivak, McClelland, Maier & Neustadt

[57] ABSTRACT

A submerged arc welding method for a high strength (2.25%-3%)Cr-3% Mo-V steel, to obtain a weld metal excellent in strength at room temperature and high temperature, toughness, and creep strength, after SR, temper brittleness resistance, cold crack resistance and SR crack resistance. The Cr-Mo steel contains: 2.00 to 3.25% of Cr, 0.90 to 1.20% of Mo, and V as essential components, and Nb, Ti, B and Ca as needed. A welding heat input is in the range of from 20 to 50 kJ/cm. The solid wire contains 0.09 to 0.19% of C, 0.30% or less of Si, 0.50 to 1.40% of Mn, 2.00 to 3.80% of Cr and 0.90 to 1.20% of Mo. The bonded flux contains 5 to 20% of $SiO_2$, 20 to 40% of MgO, 2.4 to 12% of a metal fluoride (F-converted value) and 3 to 12% of a metal carbonate ($CO_2$-converted value). A weld metal contains 0.08 to 0.15% of C, 0.05 to 0.30% of Si, 0.50 to 1.20% of Mn, 0.030 to 0.060% of O, 0.10 to 0.50% of V and 0.005 to 0.035% of Nb. P and Ti in the weld metal are restricted to 0.010% or less and 0.012% or less, respectively. The components of C, Si, Mn, O, P, Ti are added from the solid wire and the bonded flux, and the components of V and Nb are added from at least one of the wire and the bonded flux. Moreover, the welding is performed such that Ps is 3.50 to 5.50, Ps being expressed by

$$Ps = 10 \times [C]_D + 10 \times [Si]_D + [Mn]_D + 50 \times [P]_D + 20 \times [O]_D$$

where $[X]_D$ is wt % of the component X in weld metal.

4 Claims, 3 Drawing Sheets

FIG. 5A SAMPLING IS MADE SUCH THAT A NOTCH IS TO BE LOCATED ON THE UPPER PORTION OF THE UNAFFECTED ZONE

FIG. 5B   FIG. 5C

FIG. 5D (UNIT : mm)

FIG. 5E

REMELTED BY TIG WELDING

SUBMERGED ARC WELDING METHOD FOR HIGH STRENGTH CR-MO STEEL

BACKGROUND OF THE INVENTION

1. Field of the Invention

The present invention relates to a welding method for high strength Cr-Mo steels, and particularly to a submerged arc welding method for high strength (2.25%–3%)Cr-1% Mo-steels containing Cr, Mo and V as essential components, and further Nb, Ti, B, Ca and the like as needed, to obtain weld metals excellent in strength at room temperature and high temperature, toughness, and creep strength, after stress relief (SR), temper brittleness resistance (less brittleness in service under high temperature environments), cold crack resistance (difficult-to-generate delayed fracture due to hydrogen) and SR crack resistance (difficult-to-generate intergranular crack due to age-hardening precipitation).

2. Description of the Related Art

Conventionally, (2.25%–3%)Cr-1% Mo-Steels have been extensively used for structures operated under high temperature/high pressure environments such as boilers and pressure vessels because of excellent high temperature characteristics. These structures being large in size and wall thicknesses have been mostly welded by a submerged arc welding method with a high welding efficiency. In recent years, to achieve the high efficient operation for the equipment, there is a tendency to enlarge the size and wall thickness of structures and to increase the temperature and pressure of the service environment. To meet the requirement, research activities have been made to develop high strength Cr-Mo steels added with V, Nb and the like.

Similarly, there have been strong demands in welding materials toward further improved performances in terms of high temperature strength, toughness, creep strength, temper brittleness resistance, cold crack resistance and SR crack resistance. To obtain weld metals having the above-described performances, various submerged arc welding methods have been disclosed in Unexamined Japanese Patent Publication Nos. SHO 61-71196, SHO 61-232089, SHO 63-238978, HEI 1-210193, HEI 1-271096, HEI 2-182378, HEI 3-258490, HEI 4-253595, and Examined Japanese Patent Publication No. HEI 4-79752. These methods, however, seem to be insufficient in the above-described performances of weld metals.

SUMMARY OF THE INVENTION

Accordingly, an object of the present invention is to provide a submerged arc welding method for high strength (2.25%–3%)Cr-1% Mo-steels containing Cr, Mo and V as essential components, and further Nb, Ti, B, Ca and the like as needed, to obtain weld metals excellent in strength at room temperature and high temperature, toughness, and creep strength, after SR, temper brittleness resistance, cold crack resistance and SR crack resistance.

As the results of the research by the present inventors, it is found that the above object can be solved by examining welding heat input, compositions of a solid wire and bonded flux of a submerged arc welding material.

Namely, according to a first aspect of the present invention, there is provided a submerged arc welding method for a high strength Cr-Mo steel using a solid wire combined with a bonded flux, the Cr-Mo steel containing: 2.00 to 3.25 wt % (hereinafter, referred to as %) of Cr, 0.90 to 1.20% of Mo, and V as essential components, and Nb, Ti, B and Ca as needed. In this method, a welding heat input is in the range of from 20 to 50 kJ/cm. The solid wire contains 0.09 to 0.19% of C, 0.30% or less of Si, 0.50 to 1.40% of Mn, 2.00 to 3.80% of Cr and 0.90 to 1.20% of Mo, the bonded flux contains 5 to 20% of $SiO_2$, 20 to 40% of MgO, 2.4 to 12% of a metal fluoride (F-converted value) and 3 to 12% of a metal carbonate ($CO_2$-converted value). The weld metal thus obtained contains 0.08 to 0.15% of C, 0.05 to 0.30% of Si, 0.50 to 1.20% of Mn, 0.030 to 0.060% of O, 0.10 to 0.50% of V and 0.005 to 0.035% of Nb. P and Ti in the weld metal are restricted to 0.010% or less and 0.012% or less, respectively. The components of C, Si, Mn, O, P, Ti are added from the solid wire and the bonded flux, and the components of V and Nb are added from at least one of the solid wire and the bonded flux.

The metal fluoride preferably includes $CaF_2$, and the content of $CaF_2$ is in the range of from 5 to 25%.

Moreover, the welding is preferably performed such that Ps is 3.50 to 5.50, Ps being expressed by $$Ps = 10 \times [C]_D + 10 \times [Si]_D + [Mn]_D + 50 \times [P]_D + 20 \times [O]_D \quad (1)$$

where $[X]_D$ is wt % of the component X in weld metal. In this specification, "%" denotes a weight %.

BRIEF DESCRIPTION OF THE DRAWINGS

FIGS. 5A to 5E are views showing the sampling position and the shape of a cylindrical test piece for SR crack test, wherein

DETAILED DESCRIPTION OF THE PREFERRED EMBODIMENTS

Hereinafter, preferred embodiments of the present invention will be described with reference to the drawings.

As described above, the present invention is applied to weld a high strength (2.25%–3%)Cr-1% Mo steel containing Cr, Mo and V as essential components, and further, Nb, Ti, B, Ca and the like as needed, to obtain a weld metal excellent in strength at room temperature and high temperature, toughness, and creep strength, after SR, temper brittleness resistance, cold crack resistance and SR crack resistance. In this method, a welding heat input is specified to obtain a weld metal with a micro structure described later. Moreover, the weld metal contains 0.08 to 0.15% of C, 0.05 to 0.30% of Si, 0.50 to 1.20% of Mn, 0.030 to 0.060% of O, 0.10 to 0.50% of V and 0.005 to 0.035% of Nb. P and Ti in the weld metal are restricted to 0.010% or less and 0.012% or less, respectively. The components of C, Si, Mn, O, P, Ti are added from the solid wire and the bonded flux, and the components of V and Nb are added from at least one of the wire and the bonded flux.

The components of C, Si, Mn and Mo are preferably added from the solid wire in terms of the manufacturing cost. The reason why V and Nb may added to the weld metal from either the solid wire or the bonded flux is that the addition effect of V and Nb is dependent not on the addition manner but on the content in the weld metal. P should be suppressed in an amount as small as possible. In the present invention, the P content in the weld metal is restricted because P is inevitably contained in the solid wire and the bonded flux and the influence of P is dependent not on the addition manner but on the content in the weld metal.

Next, the requirements of the present invention will be described below.

1) Reason for Limiting Chemical Composition of Solid Wire

C: 0.09 to 0.19%

C is effective to enhance the strength at room temperature and high temperature, creep strength and toughness of the weld metal. To ensure the C content in the weld metal in the range of from 0.08 to 0.15% (described above), the C content in the solid wire is specified to be in the range of from 0.09 to 0.19%, preferably, in the range of from 0.13 to 0.17%.

Si ≦ 0.30%

Si has a deoxidizing effect for controlling the O content which is an important function in the present invention. To ensure the Si content in the weld metal in the range of from 0.05 to 0.30%, the Si content in the solid wire is specified to be in the range of 0.30% or less, preferably, in the range of 0.15% or less.

Mn: 0.05 to 1.40%

Like Si, Mn has an deoxidizing effect for controlling the O content which is the important function in the present invention. Moreover, as reported in the above-described documents, toughness is reduced with an increase in the O content in the weld metal, and particularly, when the O content is more than 0.030% as in the present invention, it is significantly reduced. To improve the toughness, Mn is added in the weld metal in an amount of from 0.50 to 1.20% (as described later). Taking the yield to the weld metal into consideration, the Mn content in the solid wire is specified to be in the range of from 0.50 to 1.40%, preferably, in the range of from 1.00 to 1.40%.

Cr: 2.00 to 3.80%, Mo: 0.90 to 1.20%

Cr and Mo are essential elements of the high strength 2.25–3% Cr-1% Mo steel, and in the present invention, they are suitably added from the solid wire. Even when the Cr content is less than 2.00%, and the Mo content is less then 0.90% or more than 1.20%, the effect of the present invention is obtained; however, it cannot be achieved in high temperature environments. Moreover, the addition of Cr in the range of 3.80% or more is disadvantageous in terms of the manufacturing cost. Accordingly, the Cr content of the solid wire is specified to be in the range of from 2.00 to 3.80%, preferably, in the range of from 2.25 to 3.50%, and the Mo content is specified to be in the range of from 0.90 to 1.20%, preferably, in the range of from 0.95 to 1.10%.

2) Reason for Limiting Slag Forming Agent in Bonded Flux $SiO_2$: 5 to 20%

$SiO_2$ is effective to improve the flowability of slag and to adjust the bead shape. To achieve this effect, $SiO_2$ must be added in an amount of 5% or more. When it is more than 20%, the basicity of slag is reduced, to increase the O content out of the range specified in the present invention, reducing the strength at room temperature and high temperature, toughness and creep strength. Accordingly, the content of $SiO_2$ in the flux is specified to be in the range of from 5 to 20%, preferably, in the range of from 8 to 15%.

MgO: 20 to 40%

MgO has an effect to suppress the flowability of slag and to adjust the bead shape, and further to control the O content. When it is less than 20%, the O content in the weld metal exceeds the upper limit of the range specified in the present invention. On the other hand, when it is more than 40%, the O content is less than the lower limit of the present invention, and the arc stability is made poor to deteriorate the bead shape and the slag separability. Accordingly, the content of MgO in the flux is specified to be in the range of from 20 to 40%, preferably, in the range of from 25 to 35%. In addition, MgO is also added by the decomposition of $MgCO_3$.

Metal fluoride (F-converted value): 2.4 to 12%

A metal fluoride is effective to adjust the bead shape, and to control the contents of diffusive hydrogen and oxygen of the weld metal. When the content of the metal fluoride is less than 2.4% (F-converted value), the O content exceeds the upper limit of the present invention. On the contrary, when it is more than 12%, the O content is less then the lower limit of the present invention, and further the arc stability is made poor to deteriorate the bead shape and the slag separability. Accordingly, the content of the metal fluoride in the flux is specified to be in the range of from 2.4 to 12% (F-converted value), preferably, in the range of from 5 to 10%. The sources of the metal fluorides include $CaF_2$, $AlF_3$, $BaF_2$, $Na_3AlF_6$, $MgF_2$ and $NaF$, which have the same effect when being added in the same amount (F-converted value).

$CaF_2$: 5 to 25%

$CaF_2$ has the highest decomposition temperature among the above-described metal fluorides, and is capable of being baked at a high temperature. As a result, $CaF_2$ furthermore reduces the amount of the diffusive hydrogen, to obtain the weld metal excellent in cold crack resistance. Moreover, $CaF_2$ is effective to adjust the bead shape, and to control the O content of the weld metal. When it is less than 5%, the O content exceeds the upper limit of the present invention. On the contrary, when it is more than 25%, the O content is less than the lower limit of the present invention, and the arc stability is made poor to deteriorate the bead shape and the slag separability. Accordingly, the content of $CaF_2$ in the flux is specified to be in the range of from 5 to 25%, preferably, in the range of from 10 to 20%.

Metal carbonate ($CO_2$-converted value): 3 to 12%

$CO_2$ produced by the decomposition from a metal carbonate is effective to reduce the amount of the diffusive hydrogen in the weld metal, to improve the cold crack resistance, and to control the O content. To achieve these effects, the metal carbonate must be added in an amount of 3% or more ($CO_2$-converted value). When it is more than 12%, the O content in the weld metal is more than the upper limit of the present invention, to lower the toughness. Accordingly, the content of metal carbonate is specified to be in the range of from 3 to 12% ($CO_2$-converted value), preferably, in the range of from 5 to 10%. In addition, the sources of the metal carbonates include $CaCO_3$, $BaCO_3$ and $MgCO_3$, which have the same effect when being added in the same amount ($CO_2$-converted value).

Moreover, $Na_2O$, $K_2O$, $LiO_2$, $Al_2O_3$, $BaO$, $TiO_2$, $ZrO_2$, and the like may be added in the bonded flux, as needed. The content of the metal oxide is preferably in the range of 10% or less.

Additionally, to control the contents of Si and Mn in the weld metal, Si and Mn may be added in the bonded flux. Si is added in the form of a metal powder of metal Si, Fe-Si, Ca-Si and the like. Mn is added in the form of a metal powder of metal Mn, Fe-Mn and the like.

3) Reason for Limiting Specified Component in Weld Metal

C (in weld metal): 0.08 to 0.15%

As described above, when the O content is excessively increased in the weld metal, the high temperature strength, creep strength and toughness are significantly reduced. In particular, when it is 0.030% or more, the characteristics of the weld metal are significantly reduced. However, according to the present invention, when the C content in the weld metal is specified to be in the range of from 0.08 to 0.15%, these characteristics are greatly improved. However, when the C content in the weld metal is less than 0.08%, the strength and toughness are insufficient. On the contrary, when it is more than 0.15%, the strength is excessively increased and the toughness is lowered. Accordingly, the C content in the weld metal is specified to be in the range of from 0.08 to 0.15%, preferably, in the range of from 0.10 to 0.13%.

Si: 0.05 to 0.30%

Si has a deoxidizing effect for controlling the O content. To achieve this effect, Si must be added in an amount of 0.05% or more. When it is more than 0.30%, the temper brittleness resistance and SR crack resistance are reduced, and further, the strength is excessively increased and the toughness is reduced. Accordingly, the Si content in the weld metal is specified to be in the range of from 0.05 to 0.30%, preferably, in the range of from 0.08 to 0.20%.

Mn (in weld metal): 0.50 to 1.20%

Like C, Mn has an effect of improving the high temperature strength and toughness. Moreover, it has a deoxidizing effect for controlling the O content. When it is less than 0.50%, the strength and the toughness are insufficient. On the contrary, when it is more than 1.20%, the creep strength and the temper brittleness resistance are reduced. Accordingly, the Mn content in the weld metal is in the range of from 0.50 to 1.20%, preferably, in the range of from 0.90 to 1.20%.

O (in weld metal): 0.030 to 0.060%

As the result of the research made by the present inventors, it is found that the O content in the weld metal in the range of from 0.030 to 0.06% enables the precipitation of the dense structure along grain boundaries. The area of the grain boundaries due to the dense structure is increased, which is effective to improve the temper brittleness resistance and SR crack resistance. When it is more than 0.060%, the toughness is reduced. Taking the yield from the solid wire, the kind and the blending of the slag forming agent in the bonded flux into consideration, the O content in the weld metal is specified to be in the range of from 0.030 to 0.060%, preferably, in the range of from 0.033 to 0.045%.

V (in weld metal): 0.10 to 0.50%

V has an effect of enhancing the strength at room temperature strength and high temperature and the creep strength in the weld metal. To achieve this effect, V must be added in an amount of 0.10% or more. When it is more than 0.50%, toughness, temper brittleness resistance and SR crack resistance are reduced. Taking the yield coefficients of V from the solid wire and bonded flux into consideration, V is added in the weld metal from at least one of the solid wire and the bonded flux in an amount of from 0.10 to 0.50%, preferably, in the range of from 0.20 to 0.35%.

Nb (in weld metal): 0.005 to 0.035%

Like V, Nb has the effect of enhancing the strength at room temperature and high temperature and the creep strength. To achieve this effect, Nb must be added in an amount of 0.005% or more. When it is more than 0.035%, the room temperature strength is enhanced and the toughness is lowered, and further the temper brittleness resistance and SR crack resistance are reduced. Taking the yield coefficients of Nb from the solid wire and bonded flux into consideration, Nb is added in the weld metal from at least one of the solid wire and the bonded flux in an amount of from 0.005 to 0.035%, preferably, in the range of from 0.005 to 0.020%.

P (in weld metal): $\leq 0.010\%$

P is segregated along grain boundaries, to reduce the intergranular strength. In the high strength Cr-Mo steel, V and Nb having an effect of precipitation hardening are added to enhance the high temperature strength and creep strength, so that the SR cracks tend to be generated; particularly, when the P content is large, the reduction in the intergranular strength increases the risk of the generation of the SR crack. The segregation of P along the intergranular boundaries exert adverse effect on the temper brittleness resistance. The present inventors have found that the temper brittleness resistance and SR crack resistance are improved by specifying the P content in the weld metal to be in the range of 0.010% or less. Taking the yield coefficients of P from the solid wire and bonded flux into consideration, the p content in the solid wire and bonded flux is restricted, to specify the P content in the weld metal to be in the range of 0.010% or less, preferably, in the range of 0.005% or less.

Of course, it is effective to reduce impurities such as S, Sn, As, Sb and the like, other than P, in the solid wire and bonded flux for improving the temper brittleness resistance and SR crack resistance. The amount of these impurities in the weld metal is specified to be in the range of 0.010% or less, preferably, in the range of 0.005% or less.

Ti (in weld metal): 0.012% or less

Ti has a function to reduce the toughness. The function becomes significant for the Ti content more than 0.012%. Accordingly, the Ti content in the weld metal is specified to be in the range of 0.012% or less, preferably, in the range of 0.005% or less.

Ps: 3.50 to 5.50

The result of the research made by the present inventors shows that it becomes possible to obtain a weld metal excellent in strength, toughness, temper brittleness resistance and SR crack resistance by specifying Ps in the range of from 3.50 to 5.50. As described above, the value of Ps is expressed by following formula (1).

$$Ps = 10 \times [C]_D + 10 \times [Si]_D + [Mn]_D + 50 \times [P]_D + 20 \times [O]_D \quad (1)$$

where $[X]_D$ is wt % of the component X in the weld metal.

4) Reason for limiting Welding Condition

Welding heat input: 20 to 50 kJ/cm

The result of the research made by the present inventors shows that it becomes possible to obtain an excellent weld metal in balance of in strength, toughness, temper brittleness resistance, cold crack resistance and SR crack resistance by performing the welding with a welding heat input of 20 to 50 kJ/cm using a solid wire combined with a bonded flux (see examples described later). When it is less than 20 kJ/cm, the hardenability is excessively increased, the dense structure is not sufficiently precipitated along the grain boundaries, thus deteriorating the temper brittleness resistance and SR crack resistance. On the contrary, when it is more than 50 kJ/cm, the structure is coarsened, thus deteriorating the toughness and temper brittleness resistance. The welding heat input is preferably in the range of from 30 to 40 kJ/cm.

The present invention will be more apparent by way of the following example.

EXAMPLE

Figure 1:
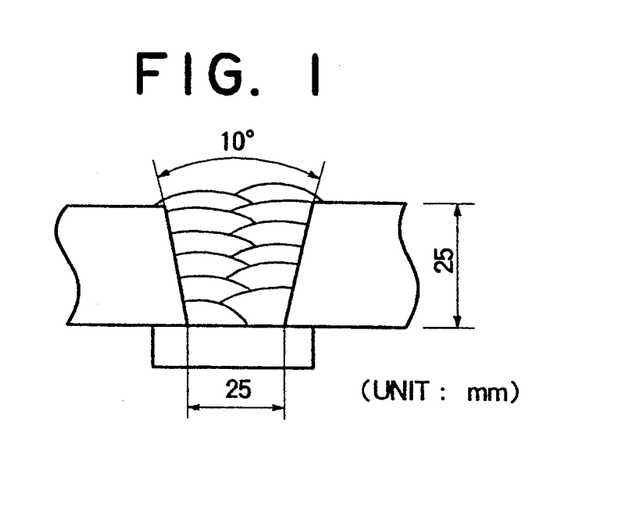
FIG. 1 is a diagram for showing the overlaying using a V-groove with a backing metal.
Figure 2:
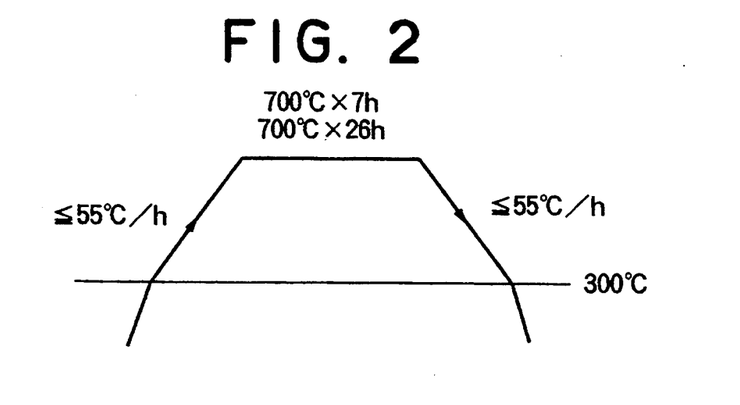
FIG. 2 is a chart showing an SR condition (for mechanical test)
Figure 3:
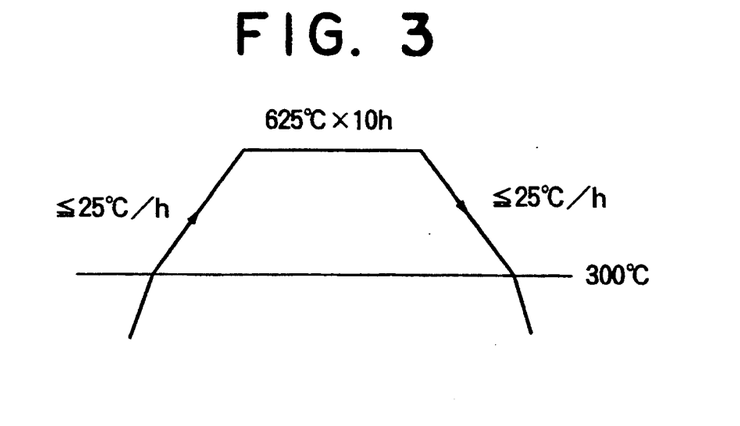
FIG. 3 is a chart showing a heat-treatment condition (SR crack test)
Figure 4:
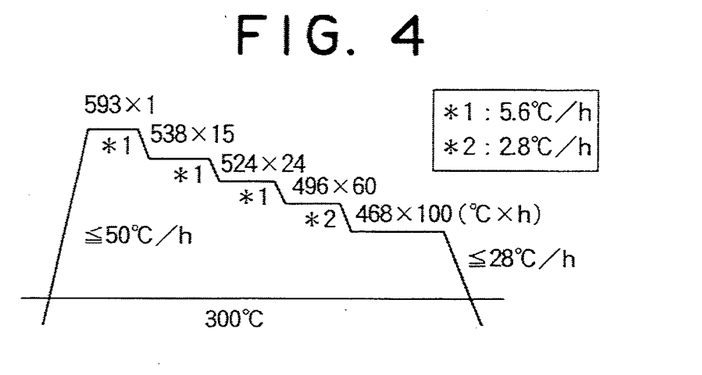
FIG. 4 is a chart showing a step cooling condition (temper brittleness test)
Figure 5A:
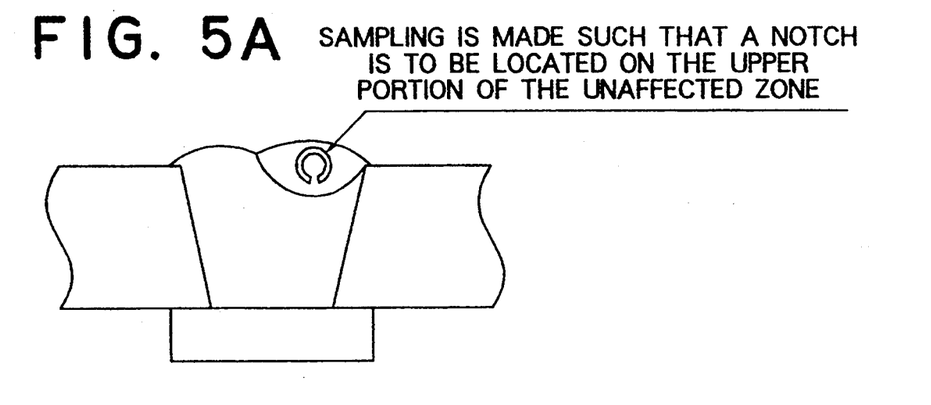
FIG. 5A shows the sampling position in which a notch is located at the upper portion of an unaffected zone.
Figure 5B:
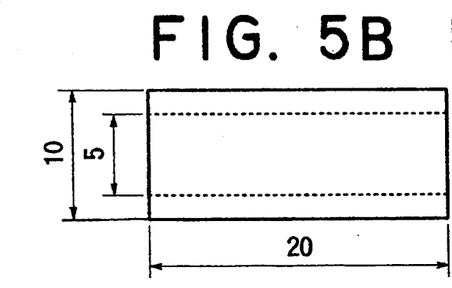
FIG. 5B is a side view of the test piece.
Figure 5C:
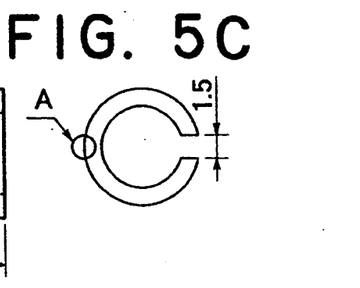
FIG. 5C is a sectional view of the test piece.
Figure 5D:
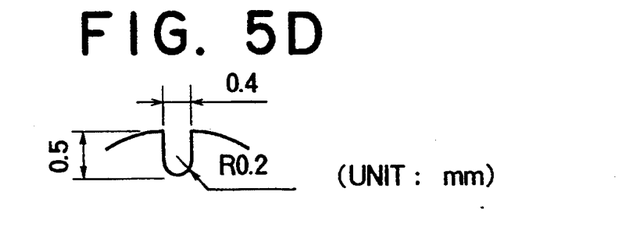
FIG. 5D is a detail view of the A portion of FIG. 5C.
Figure 5E:
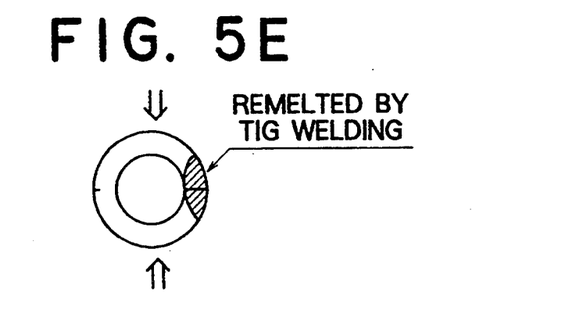
FIG. 5E shows a procedure of remelting the notch.

Using solid wires shown in Table 1 combined with bonded fluxes shown in Table 2, welding tests were made for base materials shown in Table 3 each being formed in a groove shown in FIG. 1 under welding conditions shown in Table 4. FIG. 2 shows a SR condition for mechanical test; FIG. 3 shows a heat-treatment condition for SR crack test; FIG. 4 shows a step cooling condition for temper brittleness test; and Table 5 shows a procedure for mechanical test.

As the criterion for strength, a tensile strength at room temperature of 670N/mm² or more (SR: 700° C. ×7 hours), and a tensile strength at a high temperature (454° C.) of 507 N/mm² or more (SR: 700° C. ×26 hours) were judged to be good. As the criterion for toughness and temper brittleness resistance, vTr55 (Charpy transient temperature showing the value 55J) of −50° C. or less, and ΔvTr55 (transient amount after step cooling) of 20° C. or less (SR: 700° C. ×7 hours) were judged to be good. As the criterion for creep strength, 550° C. ×1000 hours creep rapture strength of 210 N/mm² (SR: 700° C. ×26hours) was judged to be good. The cold crack was confirmed by observation of sectional micro-structure. The SR crack resistance was evaluated on the basis of the reference "Research on Stress Relief Annealing Crack (second report)" (Uchiki et al., Journal of Welding Institute: Vol. 33, No. 9 (1964), p. 718). Namely, a cylindrical test piece was sampled as shown in FIG. 5, being remelted by TIG welding while being applied with a bending stress, and was subjected to a heat treatment of 625° C. ×10 hours with a tensile residual stress left at the U-groove portion. As the criterion for SR crack resistance, the state that no crack is generated at the bottom of the U-groove portion was judged to be good.

Table 6 shows the chemical compositions of weld metals; Table 7 shows the usability characteristics, cold crack resistance and SR crack resistance of the weld metals; Table 8 shows the mechanical properties of the weld metals. Sample Nos. 1 to 9 are cases that the present invention is applied to a modified 2.25% Cr-1% Mo steel, and Sample No. 10 is the case that the present invention is applied to a modified 3% Cr-1% Mo steel.

In Sample Nos. 1 to 6 (Example), the components of each weld metal were within the range of the present invention, and the mechanical properties and SR crack resistance were good.

Figure 6:
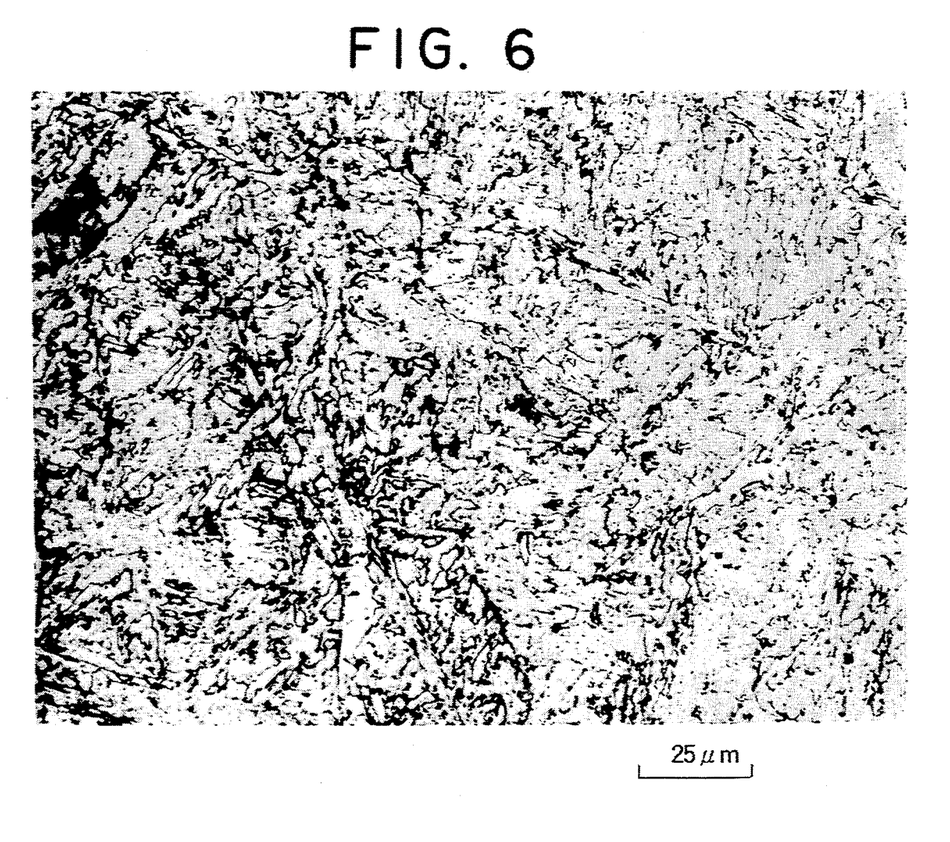
FIG. 6 is a photograph showing a micro-structure (metal structure) of a sound portion of Sample No. 7 of the present invention, wherein the sound portion is etched using 2% nital solution and the heat-treatment condition is 625° C.×10 hours.

In Sample No. 7 (Example), Ps was within the range of the present invention, and the strength and toughness were improved more than Sample Nos. 1 to 6, and further, the temper brittleness resistance and SR crack resistance were good. In addition, FIG. 6 is a photograph of the micro-structure of the sound portion, which shows that the dense structure is precipitated because of the suitable value of the O content.

In Sample No. 8 (Example), the components of the weld metal were within the range of the present invention, and the mechanical properties and SR crack resistance were good. However, Ps was larger than the range of the present invention, and the strength was increased more than that of Sample No. 7 and the toughness was slightly reduced.

Sample No. 9 (Example) was the case that V and Nb were added from the bonded flux, which showed the excellent strength, toughness, temper brittleness resistance and SR crack resistance.

Sample No. 10 (Example) was the case that the present invention was applied to the modified 3% Cr-1% Mo steel, which showed the excellent strength, toughness, temper brittleness resistance and SR crack resistance.

On the contrary, in Sample No. 11 (Comparative Example), Ps was within the range of the present invention but the contents of V and Nb were less than the range of the present invention, so that the high temperature strength and creep strength were low. In addition, other performances were good.

In Sample No. 12 (Comparative Example), Ps was within the range of the present invention but the P content was more than the range of the present invention, so that the strength and toughness were good but the temper brittleness resistance and SR crack resistance were poor.

In Sample No. 13 (Comparative Example), the O content was within the range of the present invention, and the SR crack resistance was good. However, since the contents of C and Mn were less than the range of the present invention and the Ti content was more than the range of the present invention, the strength and the toughness were poor.

In Sample No. 14 (Comparative Example), the contents of Si and Mn were more than the range of the present invention, so that the temper brittleness resistance and SR crack resistance were poor.

In Sample No. 15 (Comparative Example), the contents of C, V and Nb were more than the range of the present invention, the strength was excessively increased, to generate cold cracks, and further the toughness, temper brittleness resistance and SR crack resistance were poor.

In Sample No. 16 (Comparative Example), in the bonded flux, the content of $SiO_2$ was lower, the content of MgO was larger, the content of $CaF_2$ was larger, and the content of the metal fluoride ($CO_2$-converted value) was lower than the ranges of the present invention, so that the slag separability and the bead appearance were poor, and the content of the diffusive hydrogen was excessively increased to generate cold cracks. Moreover, SR cracks were generated along the grain boundaries. In addition, the mechanical test was interrupted because of the poor usability characteristics.

In Sample No. 17 (Comparative Example), the content of $SiO_2$ in the bonded flux was larger, the content of MgO was lower, the content of $CaF_2$ was lower, and the metal carbonate ($CO_2$-converted value) was larger than the range of the present invention, so that defects such as pockholes were generated to reduce the usability characteristics, thereby interrupting the mechanical test. In addition, since the O content was made larger, the SR crack resistance was good.

Sample No. 18 (Comparative Example) was the case that welding was performed using the same combination of the solid wire and bonded flux as Sample No. 7 (Example) under a welding condition 1 (out of the range of the present invention). Since the welding heat input was lower than the range of the present invention, the strength was increased more than Sample No. 7 to reduce the toughness. Moreover, the dense structure was not sufficiently generated along the grain boundaries, and the temper brittleness resistance and SR crack resistance were poor.

Sample No. 19 (Comparative Example) was the case that welding was performed using the same combination of the solid wire and bonded flux as Sample No. 7 (Example) under a welding condition 5 (out of range of the present invention). Since the welding heat input was more than the range of the present invention, the SR crack was not poor but the strength, toughness and temper brittleness resistance were made poor compared with Sample No. 7 (Example).

While preferred embodiments of the present invention have been described, such description is for illustrative purpose only, and it is to be understood that changes and variations may be made without departing from the spirit or scope of the following claims.

TABLE 1

| Item | Symbol | Chemical Composition (wt %) of Wire |  |  |  |  |  |  |  |  |
|---|---|---|---|---|---|---|---|---|---|---|
| | | C | Si | Mn | P | Cr | Mo | V | Nb | O |
| Example | W1 | 0.10 | 0.10 | 0.55 | 0.003 | 2.35 | 0.99 | 0.29 | 0.021 | 0.007 |
| | W2 | 0.13 | 0.15 | 0.90 | 0.004 | 2.43 | 1.02 | 0.28 | 0.023 | 0.008 |
| | W3 | 0.17 | 0.28 | 1.38 | 0.003 | 2.25 | 1.01 | 0.28 | 0.022 | 0.010 |
| | W4 | 0.13 | 0.15 | 1.10 | 0.004 | 2.33 | 1.01 | 0.09 | 0.005 | 0.010 |
| | W5 | 0.13 | 0.15 | 0.90 | 0.009 | 2.41 | 1.01 | 0.27 | 0.022 | 0.009 |
| | W6 | 0.14 | 0.15 | 1.27 | 0.004 | 3.11 | 1.02 | 0.27 | 0.022 | 0.010 |
| | W7 | 0.06 | 0.13 | 0.38 | 0.005 | 2.35 | 1.00 | 0.28 | 0.022 | 0.010 |
| Comparative | W8 | 0.13 | 0.39 | 1.65 | 0.005 | 2.33 | 0.98 | 0.28 | 0.020 | 0.008 |
| Example | W9 | 0.22 | 0.24 | 1.25 | 0.004 | 2.27 | 1.01 | 0.67 | 0.043 | 0.009 |

TABLE 2

| | | Chemical Composition (wt %) of Flux | | | | | | | | | |
|---|---|---|---|---|---|---|---|---|---|---|---|
| | | | | Metal Fluoride | | | Metal Carbonate | | | | |
| Item | Symbol | $SiO_2$ | MgO | Kind/content | F-converted Value | $TiO_2$ | Kind/content | $CO_2$-converted Value | V | Nb | P | Others |
| Example | F1 | 13 | 31 | $CaF_2$, 17 | 8.3 | 0 | $CaCO_3$, 13 | 5.7 | 0 | 0 | 0.002 | 26 |
| | F2 | 13 | 31 | $AlF_3$, 12 | 8.3 | 0 | $CaCO_3$, 13 | 5.7 | 0 | 0 | 0.002 | 31 |
| | F3 | 13 | 31 | $BaF_2$, 38 | 8.3 | 0 | $CaCO_3$, 13 | 5.7 | 0 | 0 | 0.002 | 5 |
| | F4 | 13 | 31 | $Na_3AlF_6$, 15 | 8.3 | 0 | $CaCO_3$, 13 | 5.7 | 0 | 0 | 0.002 | 28 |
| | F5 | 13 | 31 | $MgF_2$, 18 | 8.3 | 0 | $CaCO_3$, 13 | 5.7 | 0 | 0 | 0.002 | 25 |
| | F6 | 13 | 31 | NaF, 18 | 8.3 | 0 | $CaCO_3$, 13 | 5.7 | 0 | 0 | 0.002 | 25 |
| | F7 | 13 | 31 | $CaF_2$, 17 | 8.3 | 0 | $CaCO_3$, 14 | 6.2 | 0.30 | 0.05 | 0.003 | 24 |
| | F8 | 7 | 35 | $CaF_2$, 22 | 10.7 | 0 | $MgCO_3$, 21 | 10.0 | 0 | 0 | 0.003 | 15 |
| | F9 | 18 | 23 | $CaF_2$, 8 | 3.9 | 0 | $BaCO_3$, 16 | 3.5 | 0 | 0 | 0.002 | 35 |
| Comparative | F10 | 3 | 46 | $CaF_2$, 30 | 14.6 | 0 | $CaCO_3$, 5 | 1.8 | 0 | 0 | 0.003 | 16 |
| Example | F11 | 25 | 15 | $CaF_2$, 4 | 1.9 | 0 | $CaCO_3$, 31 | 13.6 | 0 | 0 | 0.003 | 26 |
| | F12 | 13 | 31 | $AlF_3$, 12 | 8.3 | 5 | $CaCO_3$, 13 | 5.7 | 0 | 0 | 0.003 | 9 |

Note)
1) The content of metal fluoride is expressed as wt % based on the total weight of flux.
2) The F-converted value is the content of fluorine in the added metal fluoride which is expressed as wt % based on the total weight of flux (in the case of ($CaF_2$, 17), from $F_2/CaF_2$ = 38/78 = 0.49, F-converted value = 17 × 0.49 = 8.3).

TABLE 3

| Symbol | Chemical Composition (wt %) of Steel Plate | | | | | | | | | |
|---|---|---|---|---|---|---|---|---|---|---|
| | C | Si | Mn | P | S | Cr | Mo | V | Nb | Fe |
| P1 | 0.11 | 0.07 | 0.56 | 0.004 | 0.002 | 2.39 | 1.00 | 0.32 | 0.025 | Bal. |
| P2 | 0.12 | 0.08 | 0.55 | 0.005 | 0.002 | 3.05 | 1.01 | 0.29 | 0.027 | Bal. |

TABLE 4

| | Condition of Submerged Arc Welding | | | | | | | |
|---|---|---|---|---|---|---|---|---|
| Item | Symbol of Welding Condition | Polarity | Electrode | Welding Current A | Arc Voltage V | Welding Speed cpm | Welding Heat Input kJ/cm | Pre-heating/interpass Temperature °C |
| Comparative Example | 1 | AC | — | 430 | 27 | 40 | 17.4 | 200–250 |
| Example | 2 | AC | Leading | 460 | 26 | 65 | 23.7 | 200–250 |
| | | | Trailing | 490 | 28 | | | |
| | 3 | AC | Leading | 510 | 28 | 55 | 33.9 | 200–250 |

TABLE 4-continued

| | | | | Condition of Submerged Arc Welding | | | | |
|---|---|---|---|---|---|---|---|---|
| Item | Symbol of Welding Condition | Polarity | Electrode | Welding Current A | Arc Voltage V | Welding Speed cpm | Welding Heat Input kJ/cm | Pre-heating/interpass Temperature °C. |
| | 4 | AC | Trailing | 560 | 30 | | | |
| | | | Leading | 560 | 32 | 50 | 46.4 | 200–250 |
| | | | Trailing | 610 | 34 | | | |
| Comparative | 5 | AC | Leading | 630 | 34 | 50 | 53.8 | 200–250 |
| Example | | | Trailing | 650 | 36 | | | |

Note)
Other welding condition: Symbol 1, single Symbols 2 to 5, tandem

TABLE 5

| | Procedure of Mechanical Test | | |
|---|---|---|---|
| Content of Test | PWHT °C. × h | Sampling Position for Test Piece | Shape of Test Piece |
| Tensile Test | Room Temperature 700 × 7 | Center of Plate Thickness | JIS Z3111 No. A1 |
| | 454° C. 700 × 26 | | JIS G0567 (6 mmφ) |
| Charpy Impact Test | 700 × 7 | | JIS Z3111 No. 4 |
| Test for Temper Brittleness | 700 × 7 + Step Cooling | | JIS Z3111 No. 4 |
| Creep Rupture Test | 700 × 26 | | JIS Z2273 (6 mmφ) |

TABLE 6

| | | | | | Chemical Composition (wt %) of Weld Metal | | | | | | | | | | |
|---|---|---|---|---|---|---|---|---|---|---|---|---|---|---|---|
| Item | No. | Wire | Flux | Steel Plate | Welding Condition | C | Si | Mn | P | Cr | Mo | V | Nb | Ti | O | Ps |
| Example | 1 | W1 | F1 | P1 | 3 | 0.09 | 0.09 | 0.52 | 0.004 | 2.28 | 0.97 | 0.27 | 0.019 | 0.003 | 0.035 | 3.22 |
| | 2 | W1 | F2 | P1 | 3 | 0.09 | 0.10 | 0.54 | 0.004 | 2.27 | 0.96 | 0.28 | 0.020 | 0.003 | 0.034 | 3.32 |
| | 3 | W1 | F3 | P1 | 3 | 0.10 | 0.09 | 0.51 | 0.003 | 2.29 | 0.99 | 0.26 | 0.020 | 0.003 | 0.034 | 3.24 |
| | 4 | W1 | F4 | P1 | 3 | 0.09 | 0.11 | 0.53 | 0.003 | 2.30 | 0.95 | 0.27 | 0.019 | 0.003 | 0.033 | 3.34 |
| | 5 | W1 | F5 | P1 | 3 | 0.09 | 0.11 | 0.50 | 0.004 | 2.28 | 0.98 | 0.26 | 0.020 | 0.003 | 0.034 | 3.38 |
| | 6 | W1 | F6 | P1 | 3 | 0.09 | 0.10 | 0.51 | 0.004 | 2.28 | 0.97 | 0.27 | 0.019 | 0.003 | 0.035 | 3.31 |
| | 7 | W2 | F8 | P1 | 4 | 0.11 | 0.12 | 0.85 | 0.003 | 2.33 | 0.98 | 0.26 | 0.021 | 0.002 | 0.058 | 4.46 |
| | 8 | W3 | F9 | P1 | 2 | 0.14 | 0.25 | 1.17 | 0.003 | 2.17 | 0.97 | 0.25 | 0.020 | 0.002 | 0.032 | 5.86 |
| | 9 | W4 | F7 | P1 | 3 | 0.11 | 0.13 | 1.00 | 0.004 | 2.29 | 0.99 | 0.26 | 0.023 | 0.003 | 0.038 | 4.36 |
| | 10 | W6 | F1 | P2 | 3 | 0.12 | 0.13 | 1.12 | 0.004 | 3.01 | 1.00 | 0.26 | 0.021 | 0.003 | 0.033 | 4.48 |
| Comparative | 11 | W4 | F1 | P1 | 3 | 0.11 | 0.13 | 0.99 | 0.004 | 2.28 | 0.98 | 0.09 | 0.004 | 0.003 | 0.039 | 4.37 |
| Example | 12 | W5 | F8 | P1 | 3 | 0.11 | 0.13 | 0.81 | 0.012 | 2.30 | 0.99 | 0.26 | 0.020 | 0.003 | 0.047 | 4.75 |
| | 13 | W7 | F12 | P1 | 3 | 0.05 | 0.10 | 0.35 | 0.005 | 2.18 | 0.97 | 0.27 | 0.021 | 0.015 | 0.036 | 2.82 |
| | 14 | W8 | F1 | P1 | 3 | 0.11 | 0.35 | 1.34 | 0.005 | 2.25 | 0.96 | 0.27 | 0.019 | 0.003 | 0.034 | 6.87 |
| | 15 | W9 | F1 | P1 | 3 | 0.18 | 0.19 | 1.12 | 0.004 | 2.14 | 0.95 | 0.55 | 0.038 | 0.002 | 0.036 | 5.74 |
| | 16 | W2 | F10 | P1 | 3 | 0.11 | 0.11 | 0.86 | 0.004 | 2.35 | 0.99 | 0.27 | 0.021 | 0.003 | 0.024 | 3.74 |
| | 17 | W2 | F11 | P1 | 3 | 0.10 | 0.10 | 0.80 | 0.004 | 2.31 | 0.97 | 0.26 | 0.020 | 0.003 | 0.068 | 4.36 |
| | 18 | W2 | F8 | P1 | 1 | 0.11 | 0.13 | 0.88 | 0.003 | 2.38 | 1.00 | 0.27 | 0.021 | 0.003 | 0.034 | 4.11 |
| | 19 | W2 | F8 | P1 | 5 | 0.11 | 0.11 | 0.80 | 0.003 | 2.33 | 0.97 | 0.25 | 0.019 | 0.002 | 0.063 | 4.21 |

TABLE 7

| | | | | Test Result of Weld Metal (1) | | |
|---|---|---|---|---|---|---|
| Item | Test No. | Wire | Flux | Usability Characteristics | Cold Crack Resistance | SR Crack Resistance |
| Example | 1 | W1 | F1 | Good | ○ | ○ |
| | 2 | W1 | F2 | Good | ○ | ○ |
| | 3 | W1 | F3 | Good | ○ | ○ |
| | 4 | W1 | F4 | Good | ○ | ○ |
| | 5 | W1 | F5 | Good | ○ | ○ |
| | 6 | W1 | F6 | Good | ○ | ○ |
| | 7 | W2 | F8 | Good | ○ | ○ |
| | 8 | W3 | F9 | Good | ○ | ○ |
| | 9 | W4 | F7 | Good | ○ | ○ |
| | 10 | W6 | F1 | Good | ○ | ○ |
| Comparative | 11 | W4 | F1 | Good | ○ | ○ |
| Example | 12 | W6 | F8 | Good | ○ | X |
| | 13 | W7 | F12 | Good | ○ | ○ |
| | 14 | W8 | F1 | Good | ○ | ○ |
| | 15 | W9 | F1 | Good | X | X |
| | 16 | W2 | F10 | Poor | X | X |
| | 17 | W2 | F11 | Poor | ○ | ○ |
| | 18 | W2 | F8 | Good | ○ | X |

TABLE 7-continued

| | | | Test Result of Weld Metal (1) | | |
|---|---|---|---|---|---|
| Item | Test No. | Wire | Flux | Usability Characteristics | Cold Crack Resistance | SR Crack Resistance |
| | 19 | W2 | F8 | Good | ○ | ○ |

Note)
○: No crack,
X: Crack

TABLE 8

| | | | | Test Result of Weld Metal (2) | | | | |
|---|---|---|---|---|---|---|---|---|
| | | | | Tensile Strength N/mm² | | | | | 550° C. × 1000 h Creep Rupture |
| Item | Test No. | Wire | Flux | Room Temperature | 454° C. | vTr55 °C. | vTr'55 °C. | ΔvTr55 °C. | Strength N/mm² |
| Example | 1 | W1 | F1 | 675 | 514 | −55 | −40 | 15 | 221 |
| | 2 | W1 | F2 | 679 | 518 | −58 | −42 | 16 | 219 |
| | 3 | W1 | F3 | 681 | 621 | −59 | 43 | 16 | 229 |
| | 4 | W1 | F4 | 676 | 516 | −53 | 41 | 12 | 217 |
| | 5 | W1 | F6 | 671 | 610 | −51 | −37 | 14 | 212 |
| | 6 | W1 | F6 | 673 | 511 | −52 | −39 | 13 | 214 |
| | 7 | W2 | F8 | 713 | 525 | −73 | −62 | 11 | 237 |
| | 8 | W3 | F9 | 761 | 556 | −64 | −60 | 14 | 265 |
| | 9 | W4 | F7 | 720 | 529 | −85 | −77 | 8 | 243 |
| | 10 | W6 | F1 | 728 | 630 | −88 | −78 | 10 | 244 |
| Comparative Example | 11 | W4 | F1 | 717 | 453 | −87 | −78 | 9 | 182 |
| | 12 | W5 | F8 | 709 | 522 | −61 | −32 | 29 | 230 |
| | 13 | W7 | F12 | 641 | 460 | −35 | −9 | 26 | 201 |
| | 14 | W8 | F1 | 734 | 531 | −63 | −21 | 42 | 230 |
| | 15 | W9 | F1 | 839 | 576 | −28 | 7 | 35 | 291 |
| | 16 | W2 | F10 | — | — | — | — | — | — |
| | 17 | W2 | F11 | — | — | — | — | — | — |
| | 18 | W2 | F8 | 805 | 668 | −69 | 42 | 27 | 250 |
| | 19 | W2 | F8 | 635 | 468 | −48 | −23 | 25 | 206 |

Note 1) Nos. 11 and 12: not tested because of poor usability characteristics
Note 2) vTr55: Charpy transient temperature showing the value of 55J
vTr'55: vTr55 after step cooling
ΔvTr55: transient amount after step cooling (vTr'55 − vTr55)

What is claimed is:

1. A submerged arc welding method for a high strength Cr-Mo steel using a solid wire combined with a bonded flux, said Cr-Mo steel containing: 2.00 to 3.25% of Cr, 0.90 to 1.20% of Mo, and V as essential components, and Nb, Ti, B and Ca as needed,
   wherein a welding heat input is in the range of from 20 to 50 kJ/cm,
   said solid wire contains 0.09 to 0.19% of C, 0.30% or less of Si, 0.50 to 1.40% of Mn, 2.00 to 3.80% of Cr and 0.90 to 1.20% of Mo,
   said bonded flux contains 5 to 20% of $SiO_2$, 20 to 40% of MgO, 2.4 to 12% of a metal fluoride (F-converted value) and 3 to 12% of a metal carbonate ($CO_2$-converted value),
   said solid wire and/or said bonded flux contain V and Nb for adding 0.10 to 0.50% of V and 0.005 to 0.035% of Nb in a weld metal, and
   said weld metal contains 0.08 to 0.15% of C, 0.05 to 0.30% of Si, 0.50 to 1.20% of Mn and 0.030 to 0.060% of O, P and Ti in said weld metal being restricted to 0.010% or less and 0.012% or less, respectively.

2. A submerged arc welding method for a high strength Cr-Mo steel according to claim 1, wherein said metal fluoride comprises $CaF_2$, and the content of $CaF_2$ is in the range of from 5 to 25%.

3. A submerged arc welding method for a high strength Cr-Mo steel according to claim 2, wherein Ps is 3.50 to 5.50, Ps being expressed by $$Ps = 10 \times [C]_D + 10 \times [Si]_D + [Mn]_D + 50 \times [P]_D + 20 \times [O]_D$$

where $[X]_D$ is wt % of the component X in weld metal.

4. A submerged arc welding method for a high strength Cr-Mo steel according to claim 1, wherein Ps is 3.50 to 5.50, Ps being expressed by $$Ps = 10 \times [C]_D + 10 \times [Si]_D + [Mn]_D + 50 \times [P]_D + 20 \times [O]_D$$

where $[X]_D$ is wt % of the component X in weld metal.

* * * * *